US012663838B2

(12) United States Patent
Wu et al.

(10) Patent No.: US 12,663,838 B2
(45) Date of Patent: Jun. 23, 2026

(54) SYNCHRONIZATION MECHANISM AND FOLDING HINGE

(71) Applicant: LUXSHARE ELECTRONIC TECHNOLOGY (KUNSHAN) LTD., Kunshan City (CN)

(72) Inventors: Changhung Wu, Kunshan City (CN); Lin Wu, Kunshan City (CN); Zhongyuan Lai, Kunshan City (CN); Yangyu Su, Kunshan City (CN); Huaxin Guo, Kunshan City (CN)

(73) Assignee: LUXSHARE ELECTRONIC TECHNOLOGY (KUNSHAN) LTD., Kunshan City (CN)

( * ) Notice: Subject to any disclaimer, the term of this patent is extended or adjusted under 35 U.S.C. 154(b) by 0 days.

(21) Appl. No.: 18/796,623

(22) Filed: Aug. 7, 2024

(65) Prior Publication Data

US 2025/0284323 A1     Sep. 11, 2025

(30) Foreign Application Priority Data

Mar. 7, 2024     (CN) .......................... 202410259058.1

(51) Int. Cl.
  E05D 3/06          (2006.01)
  G06F 1/16          (2006.01)
(52) U.S. Cl.
  CPC ............. G06F 1/1681 (2013.01); E05D 3/06 (2013.01); E05Y 2201/62 (2013.01)
(58) Field of Classification Search
  CPC .. E05D 3/12; E05D 3/18; E05D 3/122; E05D 3/06; E05D 3/10; E05D 7/0045; E05D 11/087; E05D 11/082; E05D 11/1078;

E05D 2011/085; E05D 2007/0072; G06F 1/1681; G06F 1/1616; G06F 1/1618; G06F 1/1652; G06F 1/168; E05Y 2900/606; E05Y 2900/602; E05Y 2999/00; E05Y 2201/218; E05Y 2201/62; E05Y 16/354;

(Continued)

(56)          References Cited

U.S. PATENT DOCUMENTS 9,939,851 B2 *   4/2018  Lan ........................ G06F 1/1681
11,408,214 B1 *   8/2022  Hsu ........................ H04M 1/022
(Continued)

FOREIGN PATENT DOCUMENTS

CN          116608201 A      8/2023
CN          117128238 A     11/2023

*Primary Examiner* — Chuck Y Mah
(74) *Attorney, Agent, or Firm* — Birch, Stewart, Kolasch & Birch, LLP

(57)          ABSTRACT

Provided are a synchronization mechanism and a folding hinge. In the synchronization mechanism, a base includes a spindle seat and a stop rack, and one first rotation portion is provided on each of two sides of the spindle seat along the width direction; the stop rack is detachably connected to the spindle seat, and a second rotation portion is provided on each of two sides of the stop rack along the width direction; two swing arms are rotatably disposed on two first rotation portions respectively; at least two slide rail arms are synchronously and rotatably disposed on two second rotation portions respectively, and each slide rail arm is provided with a slide groove; one end of a connecting rod shaft is connected to a respective swing arm while the other end of the connecting rod shaft is in a sliding fit with the slide groove.

19 Claims, 15 Drawing Sheets

(58) Field of Classification Search
CPC ...... E05Y 16/366–371; H04M 1/0214; H04M
1/0216; H04M 1/0222; H04M 1/022;
H04M 1/0268; H05K 5/0226; F16C
11/04; F16C 11/10
See application file for complete search history.

(56) References Cited

U.S. PATENT DOCUMENTS

| | | | | |
|---|---|---|---|---|
| 11,624,221 | B1 * | 4/2023 | Hsu | E05D 3/122 |
| | | | | 16/354 |
| 12,173,541 | B2 * | 12/2024 | Chung | G06F 1/1681 |
| 2022/0377919 | A1 * | 11/2022 | Zhang | H04M 1/022 |
| 2023/0093901 | A1 * | 3/2023 | Hsu | G06F 1/1616 |
| | | | | 361/679.01 |
| 2023/0244274 | A1 * | 8/2023 | Lin | G06F 1/181 |
| | | | | 361/679.27 |
| 2023/0315161 | A1 * | 10/2023 | Liu | H04M 1/022 |
| | | | | 361/191 |
| 2024/0015241 | A1 * | 1/2024 | Wang | H04M 1/022 |
| 2024/0036607 | A1 * | 2/2024 | Yen | G06F 1/1681 |
| 2024/0074075 | A1 * | 2/2024 | Kim | G06F 1/1616 |
| 2024/0111340 | A1 * | 4/2024 | Niu | G09F 9/301 |
| 2024/0414249 | A1 * | 12/2024 | Choi | H04M 1/022 |
| 2025/0013268 | A1 * | 1/2025 | Zhan | H04M 1/0268 |
| 2025/0126730 | A1 * | 4/2025 | Shen | G06F 1/1681 |

* cited by examiner

SYNCHRONIZATION MECHANISM AND FOLDING HINGE

CROSS-REFERENCE TO RELATED APPLICATION(S)

This application claims priority to Chinese Patent Application No. 202410259058.1 filed with the China National Intellectual Property Administration (CNIPA) on Mar. 7, 2024, the disclosure of which is incorporated herein by reference in its entirety.

TECHNICAL FIELD

The present disclosure relates to the technical field of folding screens and, in particular, a synchronization mechanism and a folding hinge.

BACKGROUND

A flexible screen is becoming thinner, which requires two sets of torsion structures to meet a torsion demand. To prevent the two sets of torsion structures from moving away from each other, a slide connection is generally implemented by using a housing connecting rod and two slide rail arms, that is, the housing connecting rod limits the positions of the two slide rail arms in the length direction so that the two torsion structures are prevented from moving away from each other. However, the manner in which the housing connecting rod is slidably connected to the two slide rail arms is prone to a synchronization drop in a rotation process, thereby causing a torsion between the two slide rail arms and the housing connecting rod. As a result, one of the two slide rail arms is easily detached from the housing connecting rod. For ease of installation, a driving shaft is generally used for connecting a base and the two sets of torsion assemblies in series. Due to a large number of parts connected in series, machining precision between the parts is high, thereby increasing machining cost.

Therefore, a synchronization mechanism must be studied urgently to solve the problem of an easy detachment of a slide rail arm and a housing connecting rod in the synchronization mechanism and the high machining cost.

SUMMARY

An object of the present disclosure is to provide a synchronization mechanism and a folding hinge to solve the problems of easy detachment of a slide rail arm and a housing connecting rod in the synchronization mechanism and the high machining cost in the related art.

To achieve the preceding object, the present disclosure provides the technical solutions below.

A synchronization mechanism is provided. The synchronization mechanism includes a base, swing arms, slide rail arms and a connecting rod shaft.

The base includes a spindle seat and a stop rack.

A first rotation portion is provided on each of the two sides of the spindle seat along a width direction.

The stop rack is detachably connected to the spindle seat, and a second rotation portion is provided on each of the two sides of the stop rack along the width direction.

The swing arms are rotatably disposed on two first rotation portions respectively.

At least two slide rail arms are synchronously and rotatably disposed on two second rotation portions respectively, and each slide rail arm is provided with a slide groove.

One end of the connecting rod shaft is connected to a swing arm, and the other end of the connecting rod shaft is in a sliding fit with the slide groove, and the swing arm is driven to rotate through the slide groove and the connecting rod shaft in a rotation process of a respective slide rail arm.

In some embodiments, one of the stop rack or the spindle seat is provided with an overlapping groove, and the other one of the stop rack or the spindle seat is provided with an inserting protrusion, and the inserting protrusion is inserted into the overlapping groove.

In some embodiments, the overlapping groove is disposed on the spindle seat, the overlapping groove passes through the spindle seat along a direction facing the stop rack, the overlapping groove is a stepped groove, and two first limit portions opposite to each other are formed at an opening of the stepped groove.

The inserting protrusion is disposed on the stop rack, the inserting protrusion includes an inserting body extending along a length direction and second limit portions disposed at an end of the inserting body and extending along the width direction, a width of the inserting protrusion at the second limit portions is greater than a width of the overlapping groove at the two first limit portions, and the second limit portions are disposed on one side facing away from the opening of the overlapping groove.

In some embodiments, the swing arm includes a swing body and a connecting portion connected to one end of the swing body, the connecting portion is in a rotation fit with the first rotation portion, the swing body is provided with a swing hole, and the connecting rod shaft passes through and is secured within the swing hole.

In some embodiments, the swing body is provided with an arc-shaped groove passing through the swing body along the length direction, each swing arm further includes a cover plate covering the arc-shaped groove, the swing hole is formed by an enclosure between the cover plate and the arc-shaped groove, and the length of the cover plate is less than the length of the arc-shaped groove in the length direction.

In some embodiments, at least two connecting rod shafts are provided in one-to-one correspondence with the at least two slide rail arms, and each connecting rod shaft has a rod body and a stop portion disposed at an end of the rod body. The rod body passes through the swing hole, the outer diameter of the stop portion is greater than the outer diameter of the swing hole, and the stop portion is located on one side of the cover plate facing away from the slide rail arm.

In some embodiments, an end surface of the stop portion is fan-shaped and disposed around an outer periphery of the rod body, and two ends of the stop portion around its axis abut against the swing body and are located on two sides of the arc-shaped groove, respectively.

In some embodiments, the rod body includes a first shaft section and a second shaft section, the diameter of the first shaft section is greater than the diameter of the second shaft section and greater than the width of the slide groove, the stop portion is disposed at an end of the first shaft section facing away from the second shaft section, the second shaft section is slidably disposed in the slide groove, and the first shaft section is in an interference fit with the swing hole or is bonded to the swing hole.

In some embodiments, the at least two slide rail arms rotate between an initial position and an end position, and the slide groove is bent downward gradually along a direction facing away from the base.

In some embodiments, each of the at least two slide rail arms is provided with a slide protrusion, the slide protrusion is configured to be in a sliding fit with a slide rail groove of a housing connecting rod, and the slide protrusion is provided with a notch for avoidance of the connecting rod shaft.

In some embodiments, the stop rack includes a stop body and two hinged protrusions disposed on two sides of the stop body respectively, the second rotation portion includes a hinged hole passing through a respective one of the two hinged protrusions along the length direction, two hinged blocks opposite to each other are provided on one end of each of the at least two slide rail arms, a hinged groove is formed between the two hinged blocks, a rotation hole passes through each of the two hinged blocks along the length direction, the two hinged protrusions are inserted into the hinged groove, and a driving shaft passes through the hinged hole and the rotation hole.

In some embodiments, each hinged protrusion is provided with a first limit protrusion and a second limit protrusion, the first limit protrusion is arc-shaped and disposed around an outer periphery of the hinged hole, and the second limit protrusion is arc-shaped and disposed around an outer periphery of the rotation hole. The slide rail arm rotates between an initial position and an end position with respect to the stop rack, when the slide rail arm is at the initial position, one end of the first limit protrusion abuts against one end of the second limit protrusion, and when the slide rail arm is at the end position, the other end of the first limit protrusion abuts against the other end of the second limit protrusion.

In some embodiments, the driving shaft includes a shaft body and a shaft limit portion, the outer diameter of the shaft body is less than the outer diameter of the shaft limit portion, the shaft body passes through the two hinged blocks and the rotation hole, the shaft limit portion is located on a side of the respective slide rail arm facing the spindle seat, and the spindle seat is provided with an avoidance notch for accommodating the shaft limit portion.

In some embodiments, two torsion assemblies are also included, each torsion assembly includes two intermediate gears engaging with each other and two main gears disposed on outer sides of the two intermediate gears respectively, two slide rail arms on the same stop rack are connected to the two main gears respectively and rotate around the axes of the two main gears, respectively, the two main gears and the two slide rail arms are relatively secured in a circumferential direction, the two intermediate gears are rotatably disposed on the stop rack, the two intermediate gears engage with the two main gears respectively, and the driving shaft passes through a gear hole of the two main gears.

In some embodiments, the main gear is provided with a limit protruding block located on a circumferential side of the gear hole, the hinged block is provided with a limit groove disposed on a circumferential side of the rotation hole, and the limit protruding block is inserted into the limit groove.

Two limit grooves are provided, one of the two limit grooves communicates with the rotation hole, the other one is spaced from the rotation hole, and two limit protruding blocks are provided and inserted into the two limit grooves, respectively.

A folding hinge is provided. The folding hinge includes door plates, housing connecting rods and the synchronization mechanism according to any preceding technical solution. Two housing connecting rods are located on two sides of the base along a width direction respectively, are in a sliding fit with slide rail arms respectively and are hinged with swing arms respectively, and two door plates are located on the two sides of the base along the width direction respectively, are in a rotation fit with two housing connecting rods respectively and are in a rotation fit with two connecting rod shafts respectively.

In some embodiments, a rotation groove is provided on a side of each of the two housing connecting rods facing a respective one of the two swing arms, one first connecting hole is provided on each of the opposite sidewalls of the rotation groove, a rotation protrusion is provided on a side of the respective swing arm facing the housing connecting rod, a second connecting hole passes through the rotation protrusion along a length direction, the rotation protrusion is inserted into the rotation groove, a connecting shaft passes through the second connecting hole, and two ends of the connecting shaft are located within two first connecting holes respectively.

In some embodiments, the folding hinge further includes a median plate. The spindle seat is provided with an overlapping groove, the stop rack is provided with an inserting protrusion, the inserting protrusion is inserted into the overlapping groove, the overlapping groove passes through the spindle seat along a thickness direction, and the median plate is soldered onto the spindle seat and covers the overlapping groove.

The present disclosure has the beneficial effects below.

The present disclosure provides a synchronization mechanism and a folding hinge. The synchronization mechanism includes the base, the swing arms, the slide rail arms and the connecting rod shaft. The base includes the spindle seat and the stop rack that are separate and detachably connected. Therefore, when the synchronization mechanism and torsion assemblies are assembled, the torsion assemblies are connected to the stop rack first, and then the stop rack is connected to the spindle seat so that a driving shaft can be prevented from passing through the spindle seat, and the two torsion assemblies can also be prevented from sharing the same one driving shaft, thereby reducing the demand for the length of the driving shaft, reducing the requirement for the machining precision and lowering the machining cost. In addition, the swing arms are rotatably connected to the spindle seat, the slide rail arms are rotatably connected to the stop rack, the swing arms are connected to the at least two slide rail arms through the connecting rod shaft so that in the rotation process, the slide rail arms are limited by the swing arms and the connecting rod shaft, the consistency of rotation angles of the slide rail arms and the housing connecting rods can be ensured, and the problem of easy detachment of the slide rail arms and the housing connecting rods can be solved.

REFERENCE LIST

Figure 1:
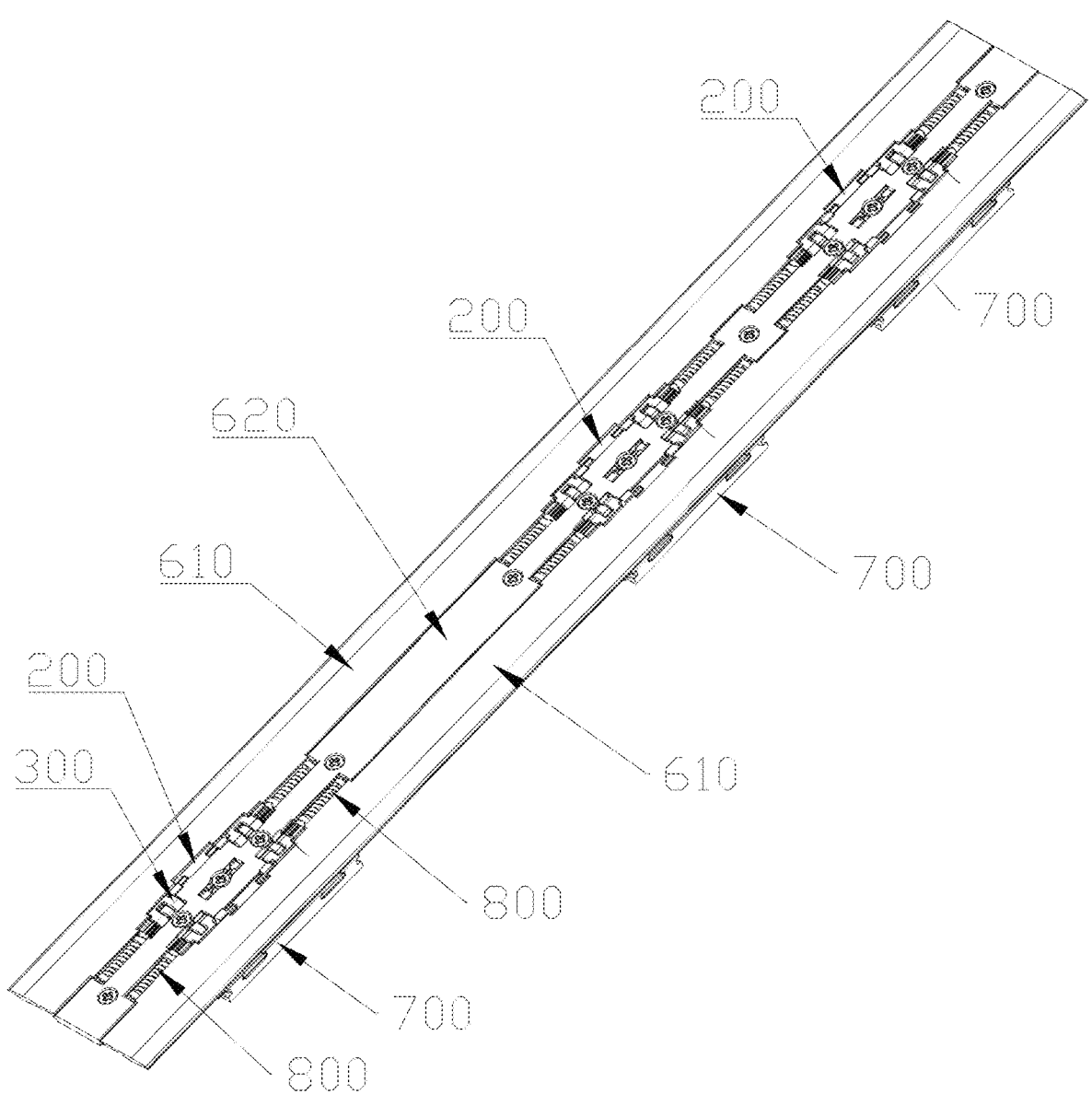
FIG. 1 is a view illustrating the structure of a folding hinge taken from a first perspective according to an embodiment of the present disclosure.
Figure 2:
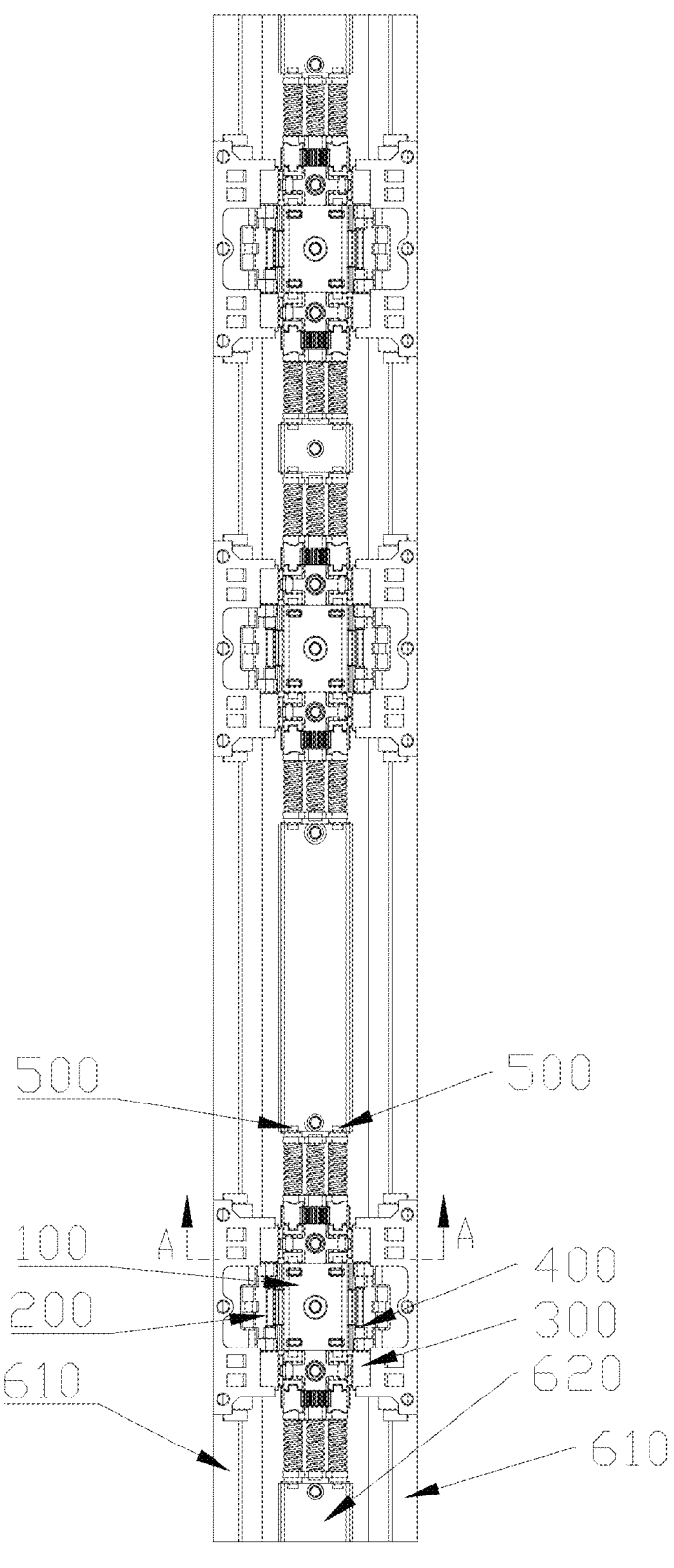
FIG. 2 is a view illustrating the structure of a folding hinge taken from a second perspective according to an embodiment of the present disclosure.
Figure 3:
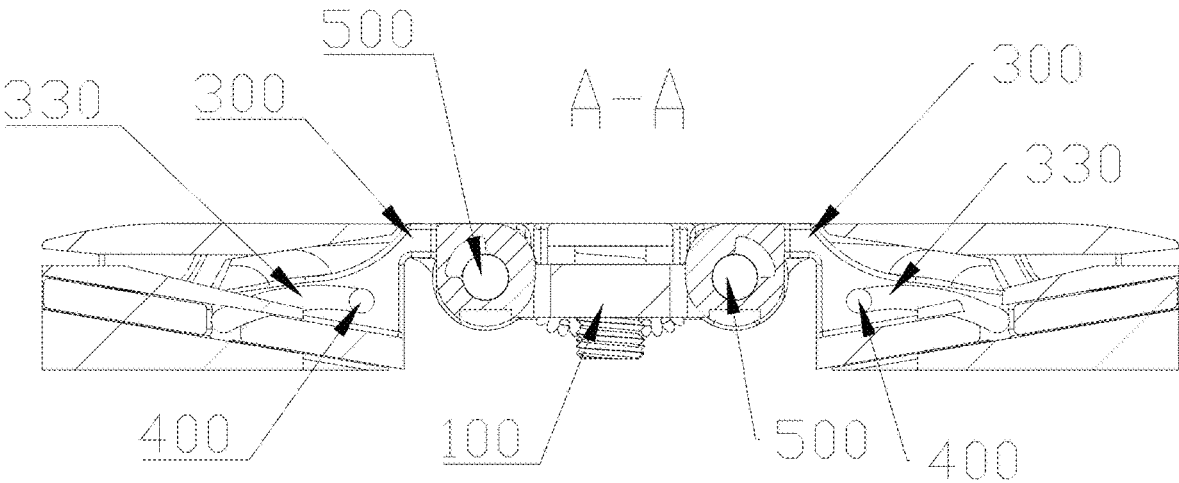
FIG. 3 is a cross-sectional view taken along A-A in FIG. 2.
Figure 4:
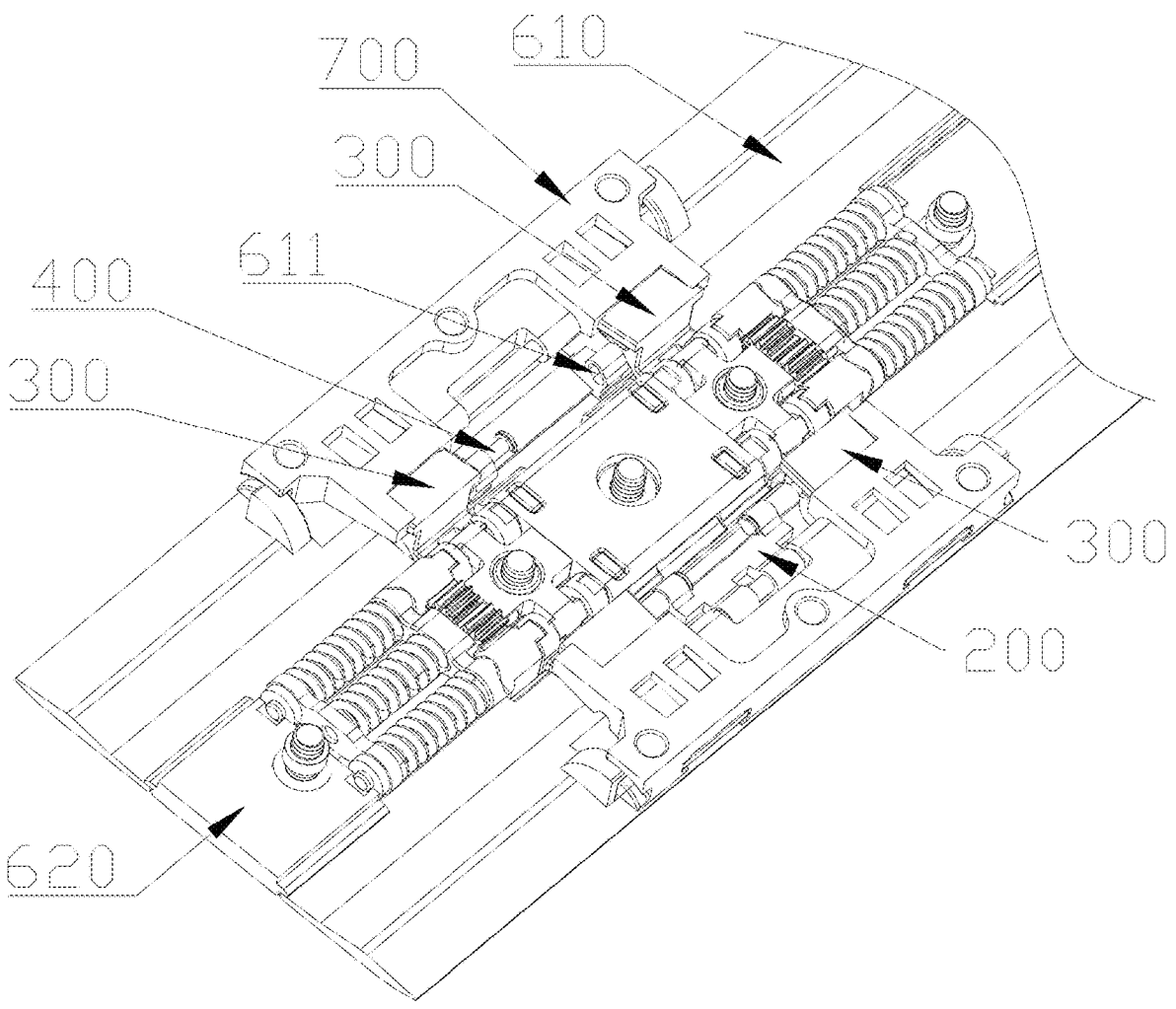
FIG. 4 is a view illustrating the partial structure of a folding hinge taken from a third perspective according to an embodiment of the present disclosure.
Figure 5:
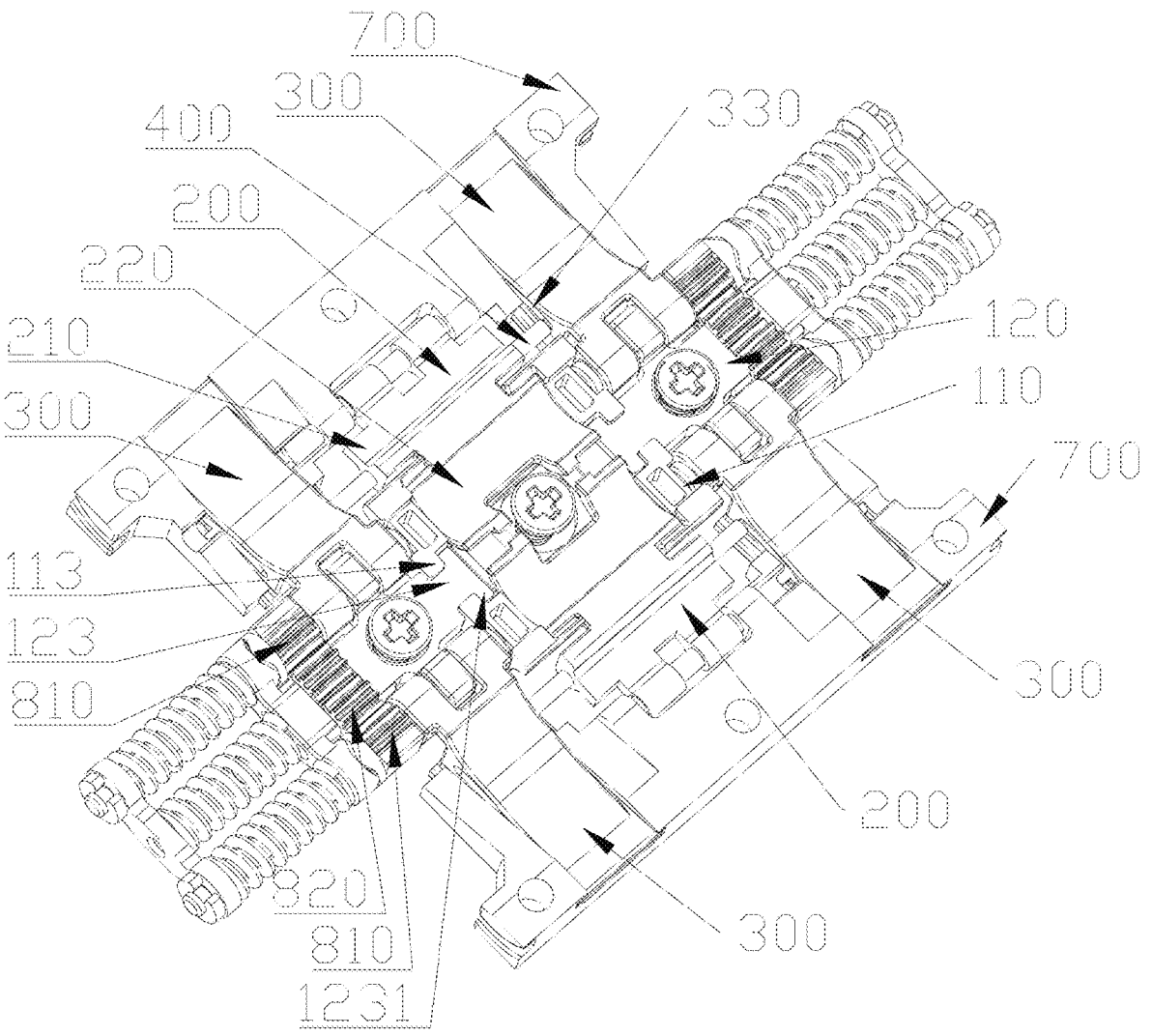
FIG. 5 is a view illustrating the structure of a synchronization mechanism taken from a first perspective according to an embodiment of the present disclosure.

100 base
110 spindle seat
111 overlapping groove
112 first rotation portion
113 first limit portion
120 stop rack
121 stop body
122 hinged protrusion
1221 second rotation protrusion
1222 first limit protrusion
123 inserting protrusion
1231 second limit portion
200 swing arm
210 swing body
211 arc-shaped groove
212 cover plate
220 connecting portion
230 swing hole
240 rotation protrusion
300 slide rail arm
310 hinged block
311 hinged groove
312 second limit protrusion
313 limit groove
314 rotation hole
320 slide protrusion
321 notch
330 slide groove
400 connecting rod shaft
410 rod body
420 stop portion
500 driving shaft
510 shaft body
520 shaft limit portion
610 door plate
611 door hole
620 median plate
700 housing connecting rod
710 slide rail groove
720 rotation groove
730 connecting shaft

800 torsion assembly
810 main gear
811 limit protruding block
812 gear hole
820 intermediate gear

DETAILED DESCRIPTION

The technical solutions of the present disclosure are described clearly and completely hereinafter in conjunction with drawings. Apparently, the described embodiments are part, not all, of embodiments of the present disclosure. Based on the embodiments of the present disclosure, all other embodiments obtained by those of ordinary skill in the art without creative work are within the scope of the present disclosure.

In the description of the present disclosure, it is to be noted that orientations or position relations indicated by terms such as "center", "upper", "lower", "left", "right", "vertical", "horizontal", "in" and "out" are based on the drawings. These orientations or position relations are intended only to facilitate and simplify the description of the present disclosure and not to indicate or imply that a device or element referred to must have such particular orientations or must be configured or operated in such particular orientations. Thus, these orientations or position relations are not to be construed as limiting the present disclosure. In addition, terms such as "first" and "second" are used only for the purpose of description and are not to be construed as indicating or implying relative importance. Terms "first position" and "second position" are two different positions. Moreover, when a first feature is described as "on", "above", or "over" a second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

In the description of the present disclosure, it is to be noted that unless otherwise expressly specified and limited, the terms "mounted", "connected to each other", or "connected" should be construed in a broad sense as securely connected, detachably connected, or integrally connected; mechanically connected or electrically connected; directly connected to each other or indirectly connected to each other via an intermediary; or interconnected between two components. For those of ordinary skill in the art, specific meanings of the preceding terms in the present disclosure may be construed based on specific situations.

Embodiments of the present disclosure are described in detail below, and examples of the embodiments are illustrated in the drawings, where the same or similar reference numerals indicate the same or similar elements or elements having the same or similar functions. The embodiments described below with reference to the drawings are solely exemplary and intended to explain the present disclosure, and are not to be construed as limiting the present disclosure.

As shown in FIGS. 1 to 14, this embodiment provides a synchronization mechanism. The synchronization mechanism includes a base 100, swing arms 200, slide rail arms 300 and a connecting rod shaft 400. The base 100 includes a spindle seat 110 and a stop rack 120. A first rotation portion 112 is provided on each side of the spindle seat 110 along the width direction. The stop rack 120 is detachably connected to the spindle seat 110. A second rotation portion 1221 is provided on each side of the stop rack 120 along the width direction. Two swing arms 200 are rotatably disposed on two first rotation portions 112 respectively. At least two slide rail arms 300 are synchronously and rotatably disposed on the two second rotation portions 1221 respectively. Each slide rail arm 300 is provided with a slide groove 330. One end of the connecting rod shaft 400 is connected to a respective swing arm 200 while the other end of the connecting rod shaft 400 is in a sliding fit with the slide groove 330. The swing arm 200 is driven to rotate through the slide groove 330 and the connecting rod shaft 400 in a rotation process of a respective slide rail arm 300.

Figure 6:
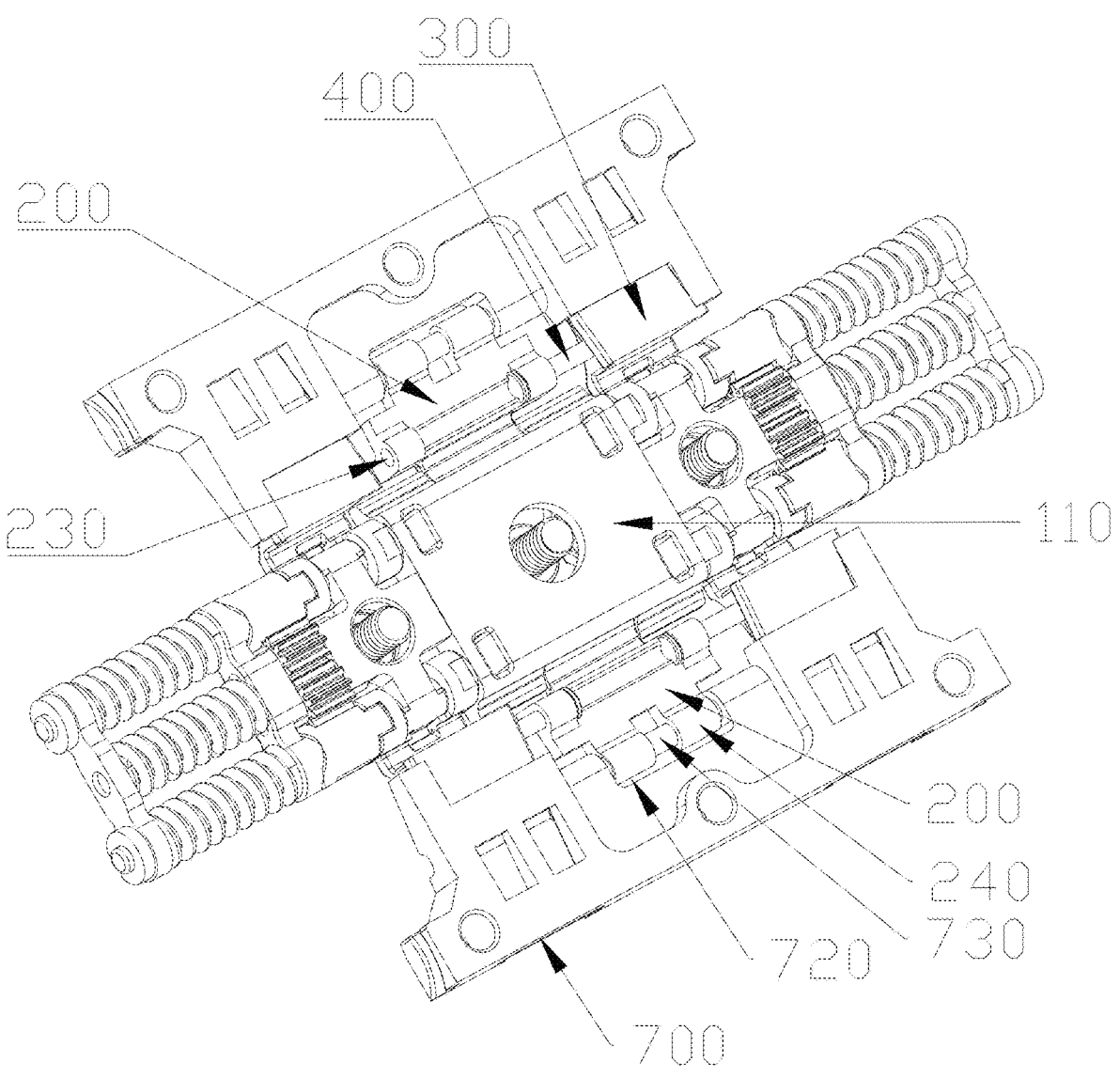
FIG. 6 is a view illustrating the structure of a synchronization mechanism taken from a second perspective according to an embodiment of the present disclosure.
Figure 7:
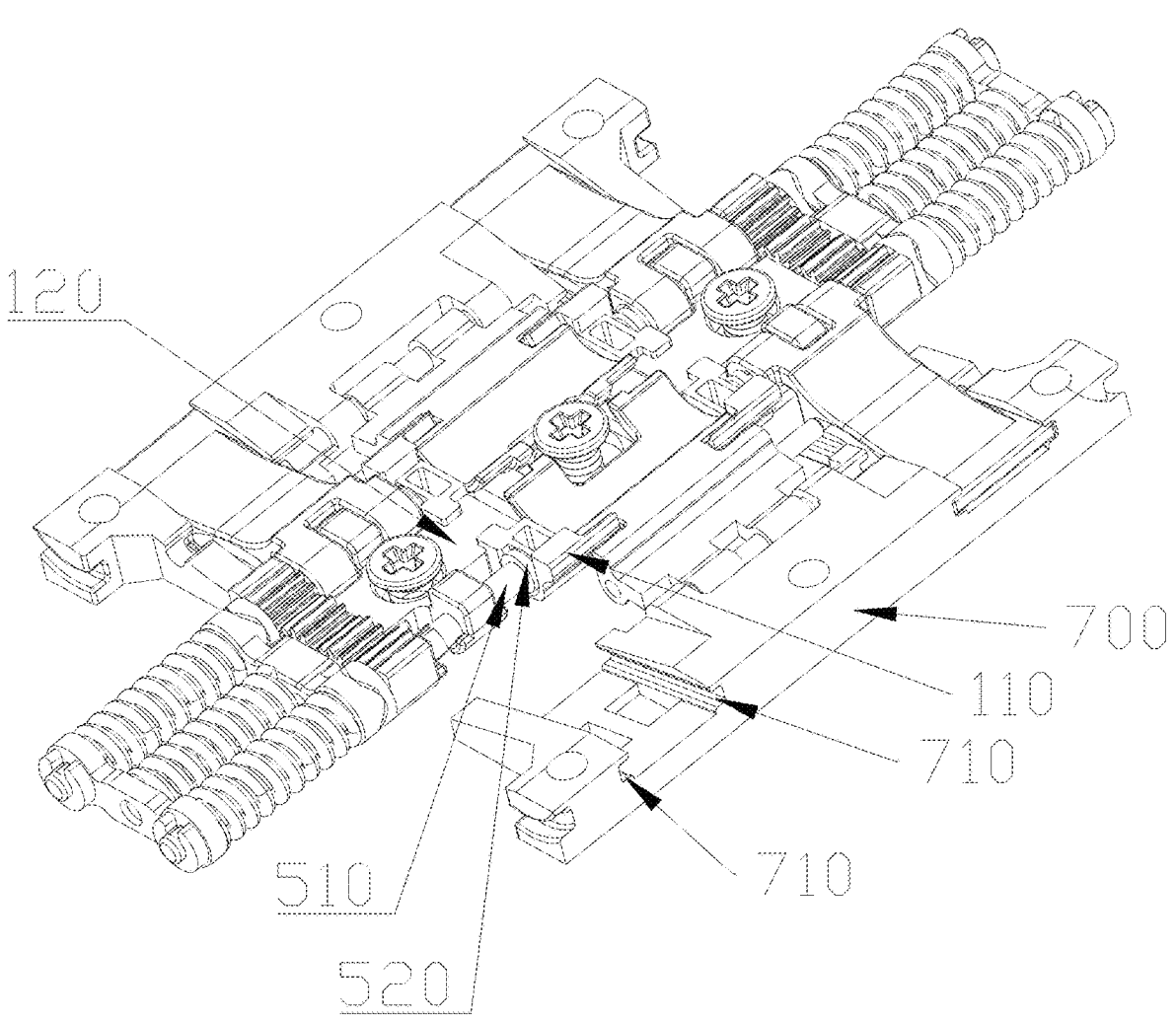
FIG. 7 is a view illustrating the structure of a synchronization mechanism taken from a third perspective according to an embodiment of the present disclosure.
Figure 8:
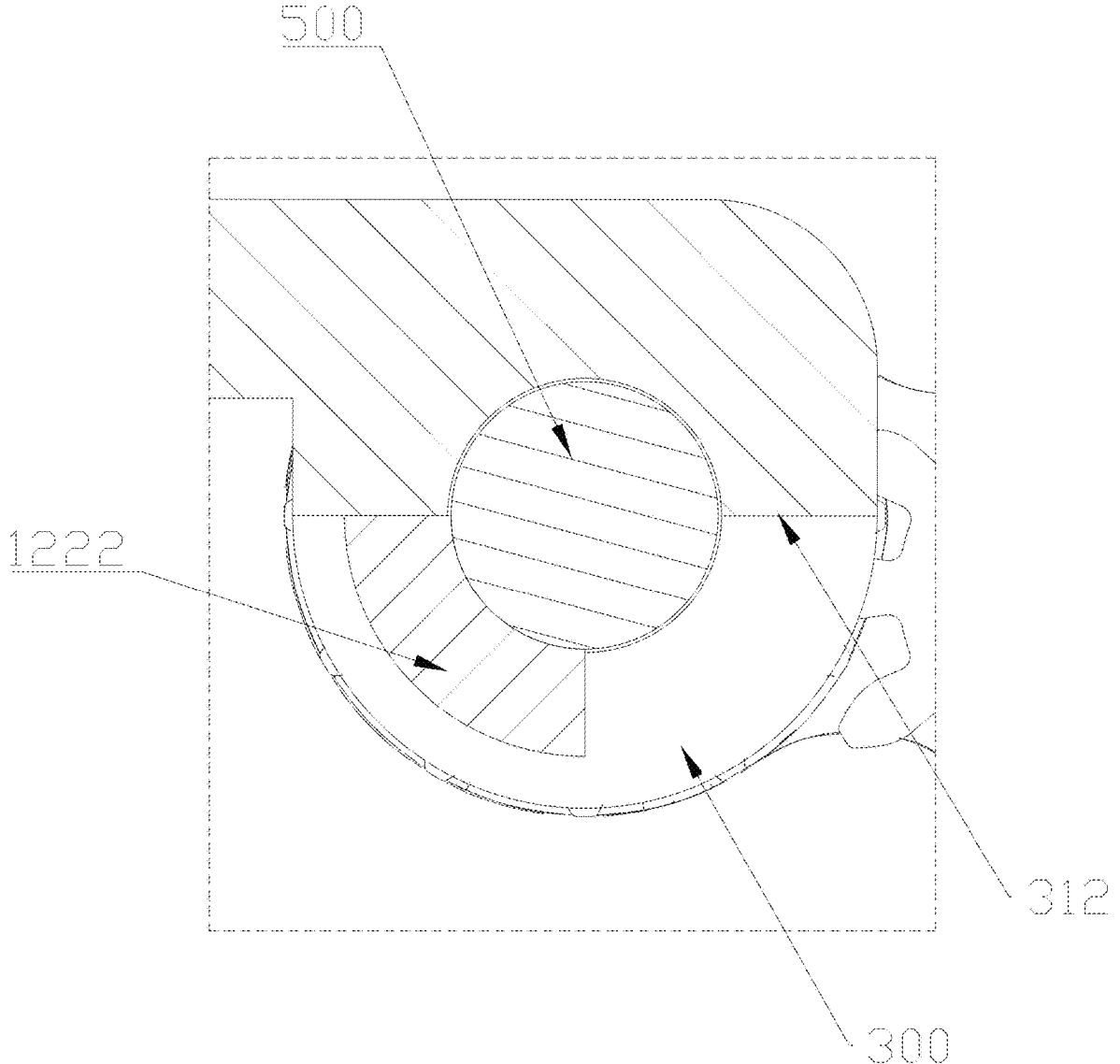
FIG. 8 is a view illustrating the structure of a first limit protrusion and a second limit protrusion according to an embodiment of the present disclosure.
Figure 9:
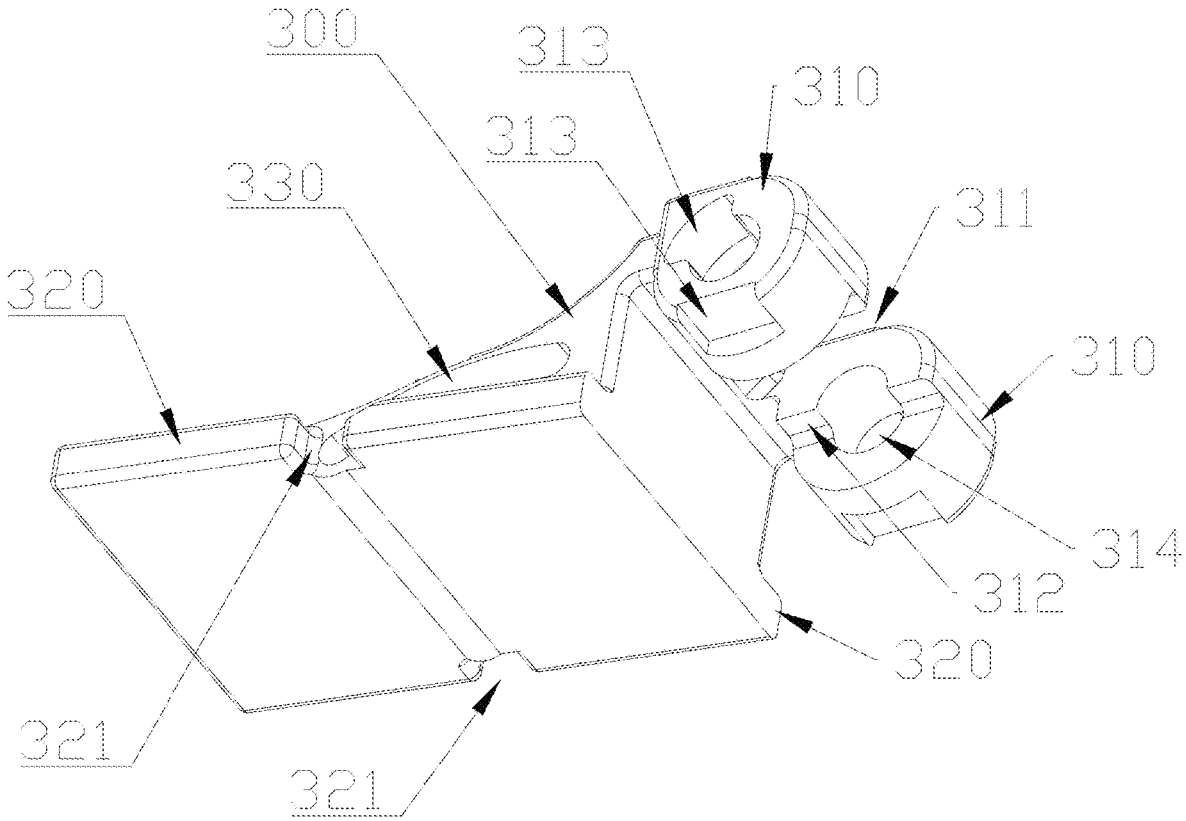
FIG. 9 is a view illustrating the structure of a slide rail arm according to an embodiment of the present disclosure.
Figure 10:
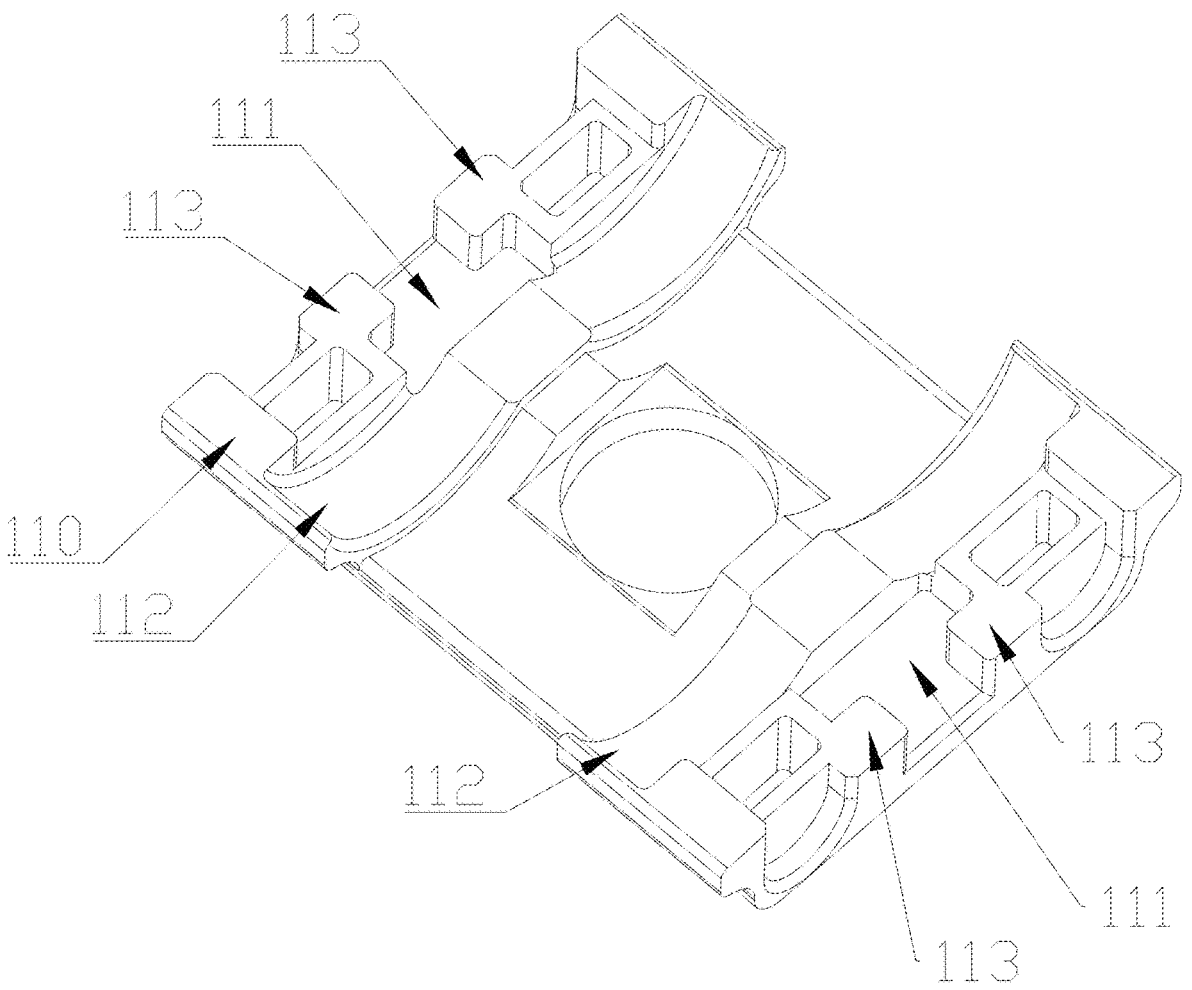
FIG. 10 is a view illustrating the structure of a spindle seat according to an embodiment of the present disclosure.
Figure 11:
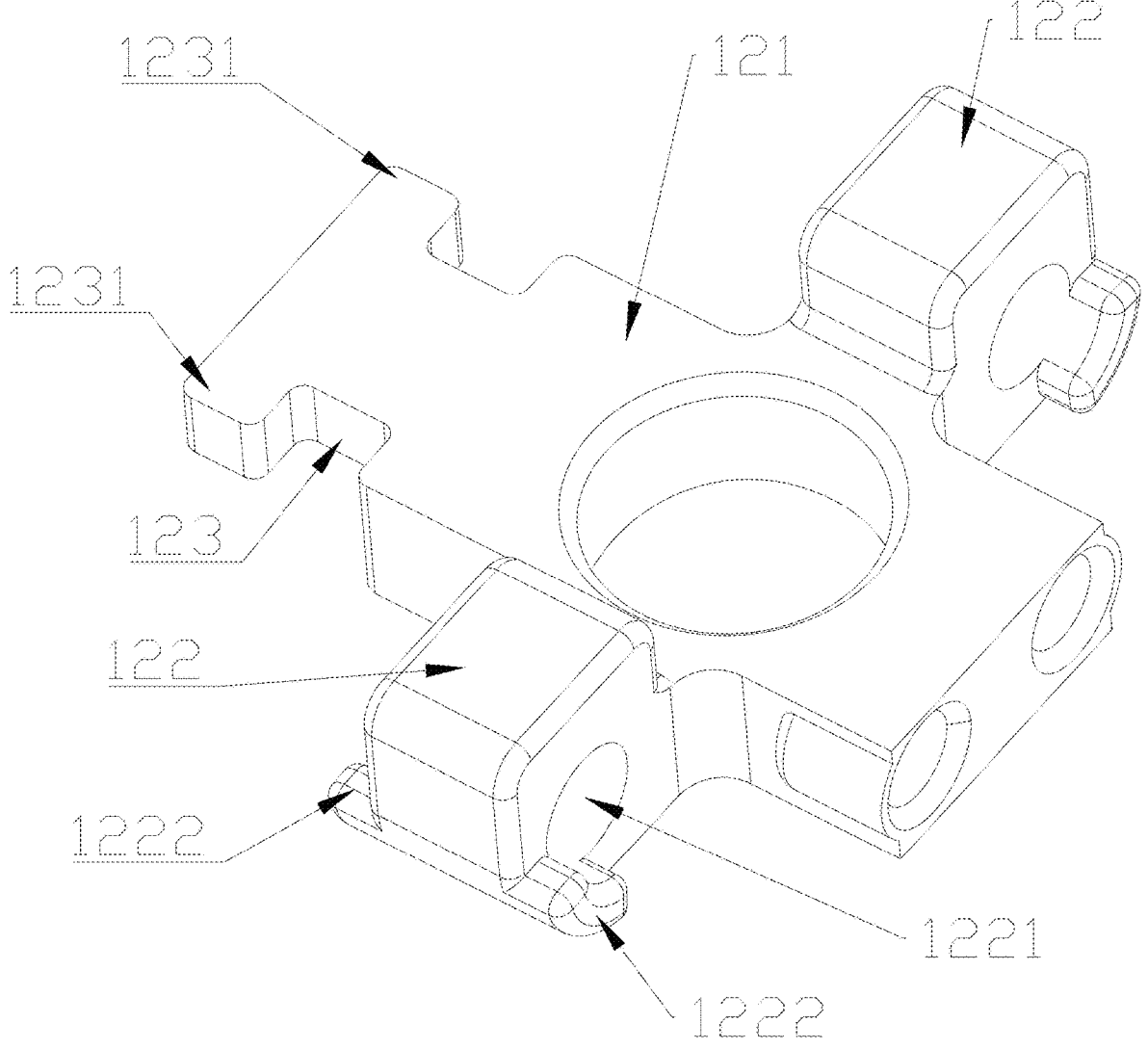
FIG. 11 is a view illustrating the structure of a stop rack according to an embodiment of the present disclosure.
Figure 12:
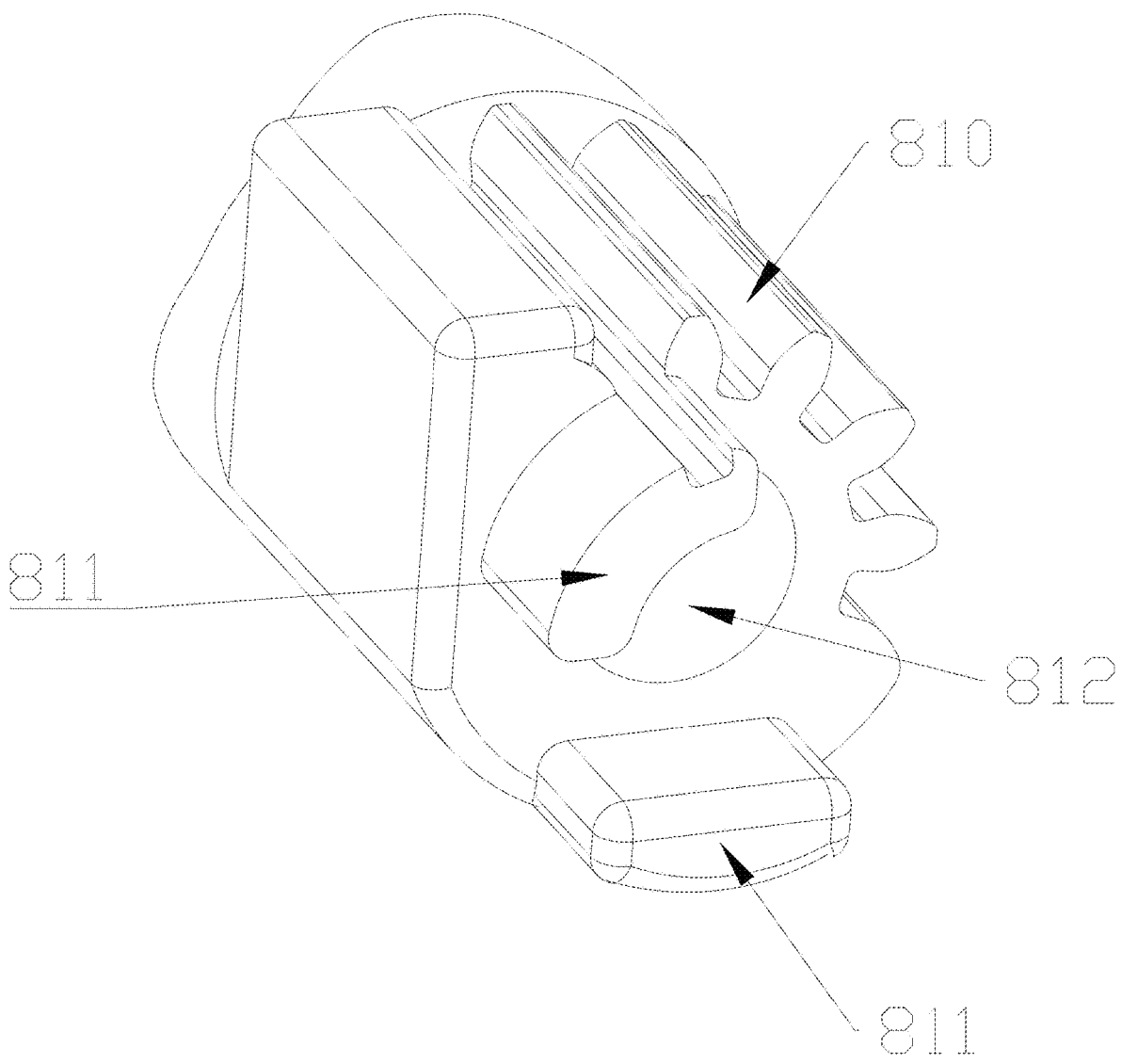
FIG. 12 is a view illustrating the structure of a main gear according to an embodiment of the present disclosure.
Figure 13:
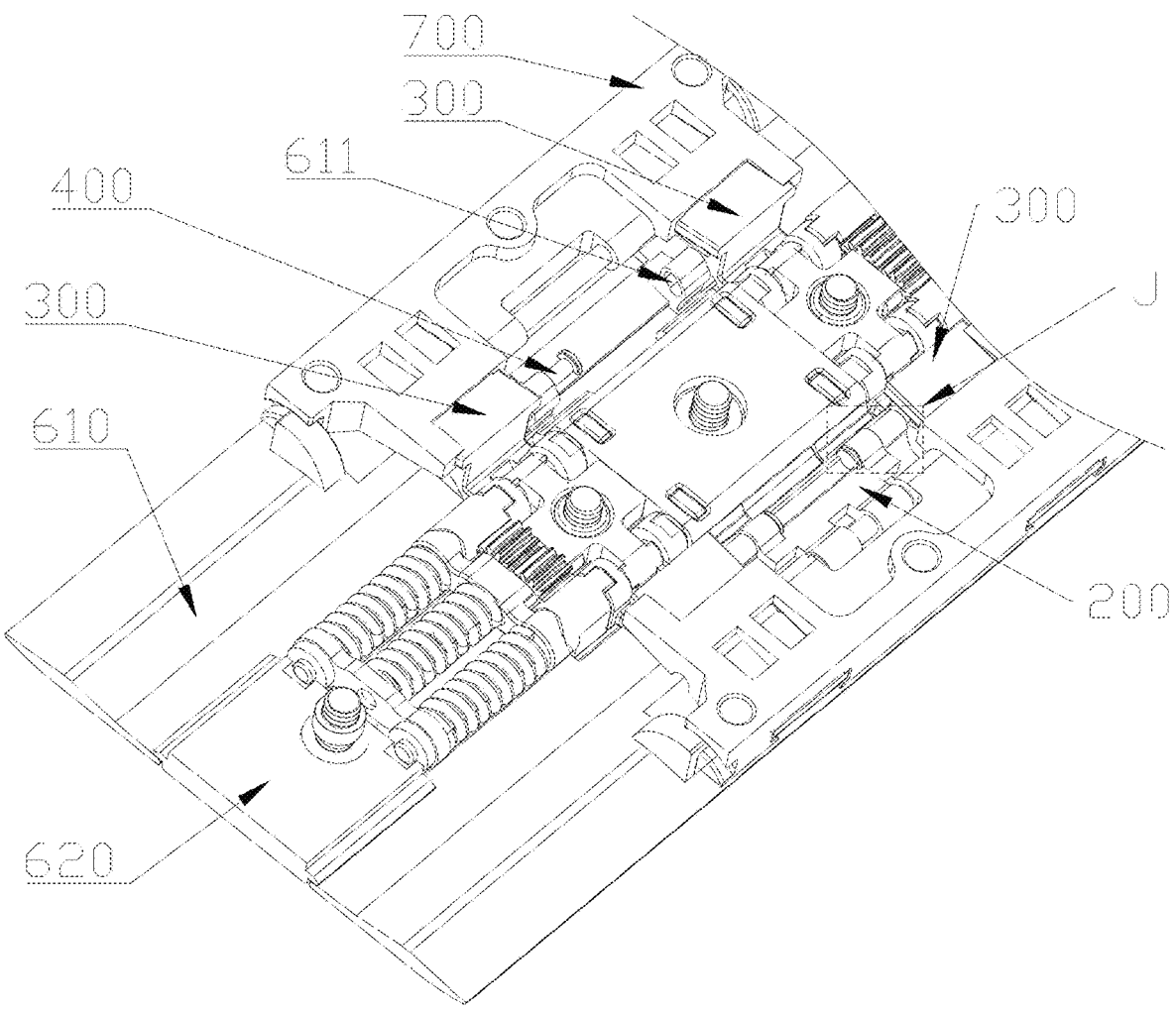
FIG. 13 is a view illustrating the partial structure of a folding hinge taken from a fourth perspective according to an embodiment of the present disclosure.
Figure 14:
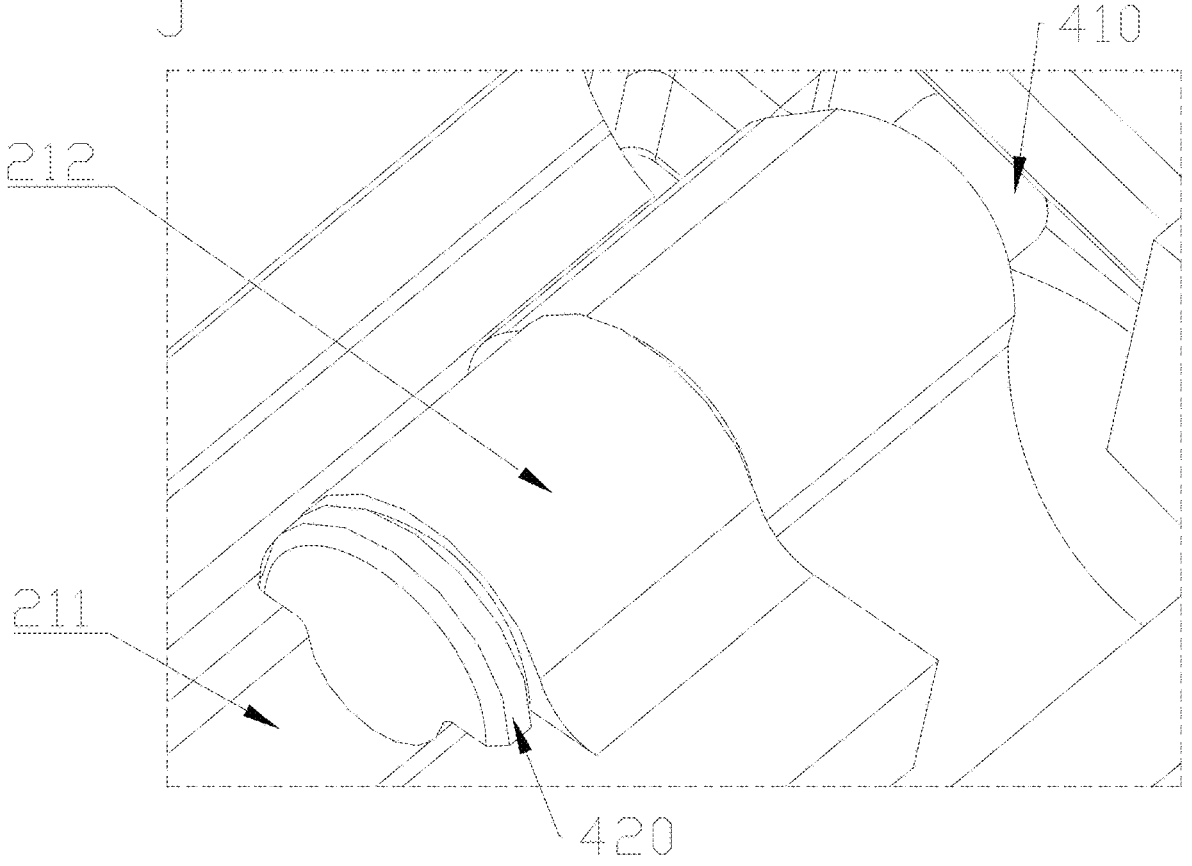
FIG. 14 is an enlarged view at J in FIG. 13.

Two torsion assemblies 800 are provided and located on two sides of the base 100 along the length direction respectively. Two stop racks 120 are provided and located on two sides of the spindle seat 110 along the length direction respectively. The two torsion assemblies 800 are connected to the two stop racks 120 respectively. Four slide rail arms 300 are provided. Two slide rail arms 300 are rotatably connected to each side of the base 100 along the width direction. The two slide rail arms 300 located on the same side of the base 100 are located on two sides of a respective swing arm 200 along the length direction respectively. Each swing arm 200 is connected to two slide rail arms 300 through the connecting rod shaft 400. In other words, as shown in FIGS. 6 and 7, two sides of the same swing arm 200 along the length direction are each secured with one connecting rod shaft 400, and each connecting rod shaft 400 is in a sliding fit with a respective slide rail arm 300. For ease of understanding, in this embodiment, the length direction is defined as the axis direction of the connecting rod shaft 400, and the width direction is defined as the direction of an interval between two slide rail arms 300 on the same stop rack 120.

With the preceding arrangement, when the synchronization mechanism and the two torsion assemblies 800 are assembled, the two torsion assemblies 800 are connected to the two stop racks 120 respectively, and then the two stop racks 120 are connected to the spindle seat 110 so that a driving shaft 500 can be prevented from passing through the spindle seat 110, and the two torsion assemblies 800 can also be prevented from sharing the same driving shaft 500, thereby reducing the demand for the length of the driving shaft 500, reducing the requirement for the machining precision and lowering the machining cost. In addition, the swing arms 200 are rotatably connected to the spindle seat 110, the slide rail arms 300 are rotatably connected to the stop racks 120, and the swing arms 200 are connected to the slide rail arms 300 through the connecting rod shafts 400 respectively so that the slide rail arms 300 are limited by the swing arms 200 and the connecting rod shafts 400 in the rotation process, the consistency of rotation angles can be ensured, and the problem caused by easy detachment of the slide rail arms 300 and a housing connecting rod 700 can be solved.

The arrangement of the swing arms 200 plays a role in connecting two slide rail arms 300 so that the rotations of the two slide rail arms 300 can remain in synchronization, thereby ensuring the consistency in the rotation angle of each slide rail arm 300 and the housing connecting rod 700 and avoiding a detachment of the slide rail arms 300 and the housing connecting rod 700.

In some embodiments, one of the stop rack 120 or the spindle seat 110 is provided with an overlapping groove 111 while the other one of the stop rack 120 or the spindle seat

110 is provided with an inserting protrusion 123, and the inserting protrusion 123 is inserted into the overlapping groove 111. The insertion is simple and can quickly connect the stop rack 120 to the spindle seat 110.

The overlapping groove 111 is disposed on the spindle seat 110, the overlapping groove 111 passes through the spindle seat 110 along the direction facing the stop rack 120, the overlapping groove 111 is a stepped groove, and two first limit portions 113 opposite to each other are formed at an opening of the stepped groove. The inserting protrusion 123 is disposed on the stop rack 120, the inserting protrusion 123 includes an inserting body extending along the length direction and second limit portions 1231 disposed at an end of the inserting body and extending along the width direction, a width of the inserting protrusion 123 at the second limit portions 123 is greater than a width of the overlapping groove 111 at the two first limit portions 113, and the second limit portions 1231 are disposed on a side facing away from the opening of the overlapping groove 111. With the help of the preceding structure, the stop rack 120 and the spindle seat 110 are interconnected so that the stop rack 120 can be effectively prevented from moving toward the direction away from the spindle seat 110, and the stability of the connection between the stop rack 120 and the spindle seat 110 can be ensured. In other embodiments, the stop rack 120 and the spindle seat 110 may also be threaded through screws. The axis of each screw is perpendicular to the length direction.

Figure 15:
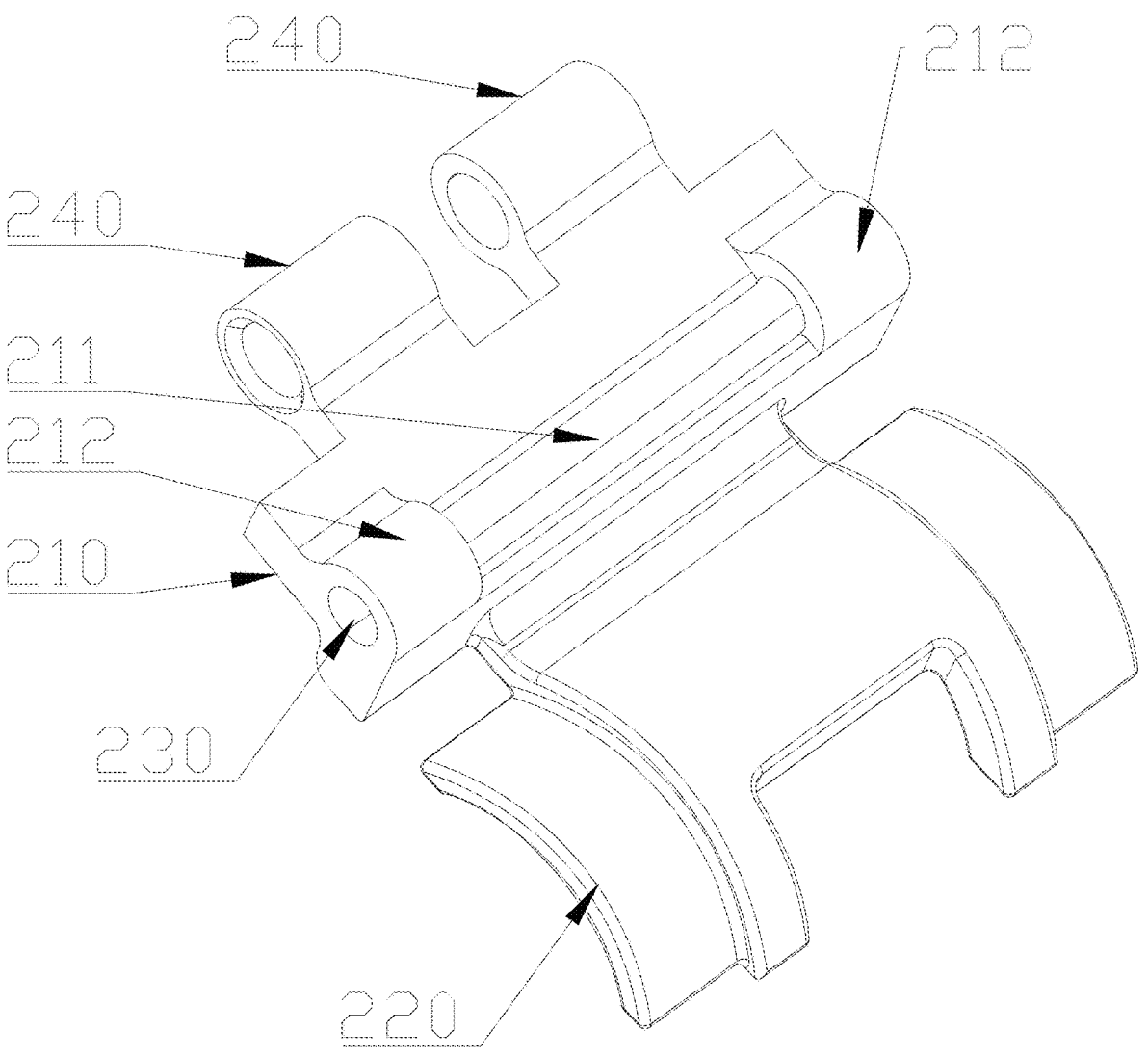
FIG. 15 is a view illustrating the structure of a swing arm according to an embodiment of the present disclosure.

In some embodiments, as shown in FIG. 15, the swing arm 200 includes a swing body 210 and a connecting portion 220 connected to one end of the swing body 210, the connecting portion 220 is in a rotation fit with the first rotation portion 112, the swing body 210 is provided with a swing hole 230, and the connecting rod shaft 400 passes through and is secured in the swing hole 230. With the preceding arrangement, the swing arms 200 are connected to the spindle seat 110, and the connecting rod shaft 400 passes through the swing hole 230 so that while being secured, the connecting rod shaft 400 can be prevented from passing through the entire swing arm 200, effectively reducing the length of the connecting rod shaft 400 and thereby reducing the coaxiality requirement and machining cost of the connecting rod shaft 400. In the length direction, the length of the swing hole 230 is roughly one-fifth of the length of the swing arm 200. In the length direction, two swing holes 230 are spaced apart on the swing arm 200 and are configured to secure the two connecting rod shafts 400 respectively.

The swing body 210 is provided with an arc-shaped groove 211. The arc-shaped groove 211 penetrates the swing body 210 along the length direction. The swing arm 200 further includes a cover plate 212 covering the arc-shaped groove 211. The swing hole 230 is formed by an enclosure between the cover plate 212 and the arc-shaped groove 211. In the length direction, the length of the cover plate 212 is less than the length of the arc-shaped groove 211. The preceding arrangement limits the manner for forming the swing hole 230. For one thing, the material for the swing arm 200 can be reduced effectively, lowering the cost, and for another thing, with the semi-open hole structure, the overall thickness of the swing arm 200 can be reduced effectively with the help of the arc-shaped groove 211 on the basis of providing the swing hole 230, thereby facilitating the reduction in the thickness of a folding hinge to which the synchronization mechanism is applied and further being more adaptive to thinner and thinner folding screen products.

At least two connecting rod shafts 400 are provided. The at least two connecting rod shafts 400 are in one-to-one correspondence with the at least two slide rail arms 300. Each connecting rod shaft 400 has a rod body 410 and a stop portion 420 disposed at an end of the rod body 410. The rod body 410 passes through the swing hole 230. The outer diameter of the stop portion 420 is greater than the outer diameter of the swing hole 230. The stop portion 420 is located on one side of the cover plate 212 facing away from the respective slide rail arm 300. The preceding arrangement facilitates the synchronous rotation of each slide rail arm 300 with the housing connecting rod 700. In addition, the arrangement of the stop portion 420 limits the displacement of the connecting rod shaft 400 in the length direction, avoids the movement of the connecting rod shaft 400 in the direction facing the slide rail arm 300 and also plays a limit role in the installation of the connecting rod shaft 400. During installation, clear feedback of installation in place can be obtained as long as the stop portion 420 abuts against the end of the swing hole 230.

In some embodiments, the end surface of the stop portion 420 is fan-shaped and disposed around the outer periphery of the rod body 410, and two ends of the stop portion 420 around its axis abut against the swing body 210 and are located on two sides of the arc-shaped groove 211 respectively. The preceding arrangement achieves a circumferential limit of the connecting rod shaft 400 and avoids the rotation of the connecting rod shaft 400 so that wear on the swing hole 230 can be reduced, facilitating the reduction in the requirement for the wall thickness of the swing hole 230 and reducing the requirement for the overall thickness of the swing arm 200.

The rod body 410 includes a first shaft section and a second shaft section. The diameter of the first shaft section is greater than the diameter of the second shaft section and greater than the width of the slide groove 330. The stop portion 420 is disposed at the end of the first shaft section facing away from the second shaft section. The second shaft section is slidably disposed in the slide groove 330. The first shaft section is in an interference fit with the swing hole 230 or is bonded to the swing hole 230. The preceding arrangement facilitates the reduction in the width of the slide groove 330 so that the overall thickness of the slide rail arm 300 can be reduced and further the thickness of the synchronization mechanism and the thickness of the folding hinge can be reduced. When the first shaft section is bonded to the swing hole 230, for one thing, more glue can be accommodated so that the connecting rod shaft 400 can be firmly bonded to the swing body 210; and for another thing, glue can also be prevented from overflowing.

The slide rail arm 300 rotates between an initial position and an end position. The slide groove 330 is bent downward gradually along the direction facing away from the base 100. With the preceding arrangement, when the slide rail arm 300 is located at the end position, the rotation angle of the swing arm 200 is greater than the rotation angle of the slide rail arm 300, which facilitates a droplet shape to be formed during a folding process of the screen, thereby avoiding a noticeable crease at a bent point of the screen and improving durability of the screen.

To ensure that the screen forms a droplet-shaped structure, a certain requirement for the curvature of the slide groove 330 is provided. In addition, considering the development trend of decreasing the thickness of an electronic device, improvements are made to the structure of the slide rail arm 300. In some embodiments, the slide rail arm 300 is provided with a slide protrusion 320. The slide protrusion 320 is configured to be in a sliding fit with a slide rail groove 710 of the housing connecting rod 700. The slide protrusion 320 is provided with a notch 321 for avoidance of the connecting rod shaft 400. The preceding arrangement can not only meet the slide requirement for the slide rail arm 300 and the housing connecting shaft 700 but also meet the curvature requirement for the slide groove 330 and effectively reduce the thickness of the slide rail arm 300. The notch 321 is located at one end of the slide protrusion 320 facing away from the spindle seat 110. It is to be noted that when the screen is flattened, the slide protrusion 320 of the slide rail arm 300 is located in the slide rail groove 710, and the notch 321 is also located in the slide rail groove 710; and when the screen is bent, the slide rail arm 300 is displaced relative to the housing connecting shaft 700, and a part (the part bound by the notch 321 and facing the hinged block 310) of the slide protrusion 320 and the corresponding part of the notch 321 move out of the slide rail groove 710 so that the connecting rod shaft 400 can move to the notch 321 smoothly. In addition, after the notch 321 moves out of the slide rail groove 710, the other part (the part bound by the notch 321 and away from the hinged block 310) of the slide protrusion 320 is still in the slide rail groove 710 to ensure the reliability of the connection between the slide rail arm 300 and the housing connecting rod 700.

Further, an avoidance portion is provided on one side of the housing connecting rod 700 facing the connecting rod shaft 400 for avoidance of the notch 321 so that the notch 321 can move out of the slide rail groove 710 as early as possible. In other words, that is, among two slide rail grooves 710 that are on the housing connecting rod 700 and correspond to the same slide rail arm 300, the length of the outer slide rail groove 710 is greater than the length of the inner slide rail groove 710.

The stop rack 120 includes a stop body 121 and two hinged protrusions 122 disposed on two sides of the stop body 121 respectively. The second rotation portion 1221 includes a hinged hole passing through a respective hinged protrusion 122 along the length direction. One end of the slide rail arm 300 is provided with two hinged blocks 310 opposite to each other. A hinged groove 311 is formed between the two hinged blocks 310. Each hinged block 310 is provided with a rotation hole 314 penetrating the hinged block 310 along the length direction. The hinged protrusion 122 is inserted into the hinged groove 311. A driving shaft 500 passes through the hinged hole and the rotation hole 314. The preceding arrangement achieves the rotation connection between the stop rack 120 and the slide rail arm 300 and can effectively limit the movement of the slide rail arm 300 with respect to the stop rack 120 in the length direction so that the stability of the connection between the slide rail arm 300 and the stop rack 120 can be improved.

The driving shaft 500 includes a shaft body 510 and a shaft limit portion 520. The outer diameter of the shaft body 510 is less than the outer diameter of the shaft limit portion 520. The shaft body 510 passes through the hinged blocks 310 and the rotation hole 314. The shaft limit portion 520 is located on one side of the slide rail arm 300 facing the spindle seat 110. The spindle seat 110 is provided with an avoidance notch for accommodating the shaft limit portion 520.

Each hinged protrusion 122 is provided with a first limit protrusion 1222. The first limit protrusion 1222 is arc-shaped and disposed around the outer periphery of the hinged hole. Each hinged block 310 is provided with a second limit protrusion 312. The second limit protrusion 312 is arc-shaped and disposed around the outer periphery of the rotation hole 314. The slide rail arm 300 rotates between the initial position and the end position with respect to the stop rack 120, when the slide rail arm 300 is at the initial position, one end of the first limit protrusion 1222 abuts against one end of the second limit protrusion 312, and when the slide rail arm 300 is at the end position, the other end of the first limit protrusion 1222 abuts against the other end of the second limit protrusion 312. The preceding arrangement achieves a limitation on the rotation extreme position of the slide rail arm 300. Due to the arrangement of the second limit protrusion 312, the thickness of the hinged block 310 is increased so that the structural strength of the hinged block 310 can be increased, thereby facilitating the improvement in the reliability of the slide rail arm 300.

Each torsion assembly 800 includes two intermediate gears 820 engaging with each other and two main gears 810 disposed on outer sides of the two intermediate gears 820 respectively. Two slide rail arms 300 on the same stop rack 120 are connected to the two main gears 810 respectively and rotate around the axes of the two main gears 810 respectively. The two main gears 810 and the slide rail arms 300 are relatively secured in the circumferential direction. The two intermediate gears 820 are rotatably disposed on the stop rack 120. The two intermediate gears 820 engage with the two main gears 810 respectively. The driving shaft 500 passes through a gear hole 812 of the main gear 810. The main gear 810 is provided with a limit protruding block 811 located on a circumferential side of the gear hole 812. The hinged block 310 is provided with a limit groove 313 disposed on a circumferential side of the rotation hole 314. The limit protruding block 811 is inserted into the limit groove 313. Two limit grooves 313 are provided, one of the two limit grooves 313 communicates with the rotation hole 314 while the other one of the two limit grooves 313 is spaced from the rotation hole 314. Two limit protruding blocks 811 are provided and inserted into the two limit grooves 313 respectively.

Two limit grooves 313 are provided on the back of each hinged block 310. The preceding arrangement may allow the slide rail arm 300 to be used at any position, that is, the slide rail arm 300 at each position may be replaced with each other, so that the number of mode openings can be reduced effectively, the cost can be lowered, and the installation difficulty can be reduced.

This embodiment further provides a folding hinge. The folding hinge includes door plates 610, housing connecting rods 700 and the synchronization mechanism in the preceding embodiment. Two housing connecting rods 700 are located on the two sides of the base 100 along the width direction respectively, are in a sliding fit with the slide rail arms 300 respectively and are hinged with a respective swing arm 200. Two door plates 610 are located on the two sides of the base 100 along the width direction respectively, are in a rotation fit with the housing connecting rods 700 respectively and are in a rotation fit with connecting rod shafts 400 respectively.

The preceding arrangement prevents the driving shaft 500 from passing through the spindle seat 110 and also prevents the two torsion assemblies 800 from sharing the same driving shaft 500 so that the demand for the length of the driving shaft 500 can be reduced, the requirement for the machining precision can be reduced, and the machining cost can be lowered. In addition, the swing arms 200 are rotatably connected to the spindle seat 110, the slide rail arms 300 are rotatably connected to the stop rack 120, and the swing arms 200 are connected to the slide rail arms 300 through the connecting rod shafts 400 so that in the rotation process, the slide rail arms 300 are limited by the swing arms 200 and the connecting rod shafts 400, the consistency in the rotation angle can be ensured, and the problem caused by easy detachment of the at least two slide rail arms 300 and the two housing connecting rods 700 can be solved. Finally, when the folding hinge is used, the connection relationship of the door plates 610 enables the door plates 610 to flip with respect to the housing connecting rods 700 respectively so that the screen can generate a droplet structure, avoiding creases at bent points of the screen.

Each door plate 610 is provided with a door hole 611, and the connecting rod shaft 400 is configured to pass through the door hole 611 to drive the door plate 610 to rotate with respect to the respective housing connecting rod 700 so that the screen can be extruded to form a droplet shape.

In some embodiments, one side of the housing connecting rod 700 facing the swing arm 200 is provided with a rotation groove 720, one first connecting hole is provided on each of the opposite sidewalls of the rotation groove 720, as shown in FIG. 15, a rotation protrusion 240 is provided on one side of the swing arm 200 facing the housing connecting rod 700, the rotation protrusion 240 is provided with a second connecting hole penetrating the rotation protrusion 240 along the length direction, the rotation protrusion 240 is inserted into the rotation groove 720, a connecting shaft 730 passes through the second connecting hole, and two ends of the connecting shaft 730 are located in two first connecting holes respectively. The preceding arrangement connects the housing connecting rods 700 to the swing arms 200 and avoids a relative displacement between the housing connecting rods 700 and the swing arms 200 in the length direction so that the housing connecting rods 700 can be stably connected to the swing arms 200 respectively.

In some embodiments, the folding hinge further includes a median plate 620, the spindle seat 110 is provided with the overlapping groove 111, the stop rack 120 is provided with the inserting protrusion 123, the inserting protrusion 123 is inserted into the overlapping groove 111, the overlapping groove 111 penetrates the spindle seat 110 along the thickness direction, and the median plate 620 is soldered onto the spindle seat 110 and covers the overlapping groove 111. With the help of the preceding structure, for one thing, the median plate 620 is connected to the spindle seat 110; and for another thing, the median plate 620 seals the overlapping groove 111. Therefore, during assembly, before the overlapping groove 111 is sealed, the stop rack 120 may be in an inserting fit with the spindle seat 110 easily, and after the median plate 620 is connected, the stop rack 120 is secured to the spindle seat 110 in an all-round manner.

Apparently, the preceding embodiments of the present disclosure are only illustrative examples of the present disclosure and are not intended to limit the implementations of the present disclosure. For those of ordinary skill in the art, changes or alterations in other different forms may also be made based on the preceding description. All examples cannot be and do not need to be exhausted herein. Any modifications, equivalent substitutions and improvements made within the spirit and principle of the present disclosure fall within the scope of the claims of the present disclosure.

What is claimed is:

1. A synchronization mechanism, comprising:
   a base, wherein the base comprises a spindle seat and a stop rack, wherein two first rotation portions are respectively provided on two sides of the spindle seat along a width direction; the stop rack is detachably connected to the spindle seat, and two second rotation portions are respectively provided on two sides of the stop rack along the width direction, wherein one of the stop rack or the spindle seat is provided with an overlapping groove, the other one of the stop rack or the spindle seat is provided with an inserting protrusion, and the inserting protrusion is inserted into the overlapping groove;

two swing arms, wherein the two swing arms are rotatably disposed on the two first rotation portions respectively;

two slide rail arms, wherein the two slide rail arms are synchronously and rotatably disposed on the two second rotation portions respectively, and each of the two slide rail arms is provided with a slide groove; and two connecting rod shafts, wherein each of the two connecting rod shafts comprises a first end and a second end, the first end of each of the two connecting rod shafts is connected to a respective one of the two swing arms, the second end of each of the two connecting rod shafts is in a sliding fit with the slide groove of a respective one of the two slide rail arms, and the two slide rail arms are configured to rotate to respectively drive the two swing arms.

2. The synchronization mechanism according to claim 1, wherein the overlapping groove is disposed on the spindle seat, the overlapping groove passes through the spindle seat along a direction facing the stop rack, the overlapping groove is a stepped groove, and two first limit portions opposite to each other are formed at an opening of the stepped groove; and the inserting protrusion is disposed on the stop rack, the inserting protrusion comprises an inserting body extending along a length direction and second limit portions disposed at an end of the inserting body and extending along the width direction, a width of the inserting protrusion at the second limit portions is greater than a width of the overlapping groove at the two first limit portions, and the second limit portions are disposed on one side facing away from the opening of the overlapping groove.

3. The synchronization mechanism according to claim 1, wherein each of the two swing arms comprises a swing body and a connecting portion connected to one end of the swing body, the connecting portion is in a rotation fit with a respective one of the two first rotation portions, the swing body is provided with a swing hole, and each of the two connecting rod shafts passes through and is secured within the swing hole.

4. The synchronization mechanism according to claim 3, wherein the swing body is provided with an arc-shaped groove passing through the swing body along a length direction, each of the two swing arms further comprises a cover plate covering the arc-shaped groove, the swing hole is formed by an enclosure between the cover plate and the arc-shaped groove, and a length of the cover plate is less than a length of the arc-shaped groove in the length direction.

5. The synchronization mechanism according to claim 3, wherein each of the two connecting rod shafts has a rod body and a stop portion disposed at an end of the rod body, wherein the rod body passes through the swing hole, an outer diameter of the stop portion is greater than an outer diameter of the swing hole, and the stop portion is located on one side of the cover plate facing away from a respective one of the two slide rail arms.

6. The synchronization mechanism according to claim 5, wherein an end surface of the stop portion is fan-shaped and disposed around an outer periphery of the rod body, and two ends of the stop portion around an axis of the stop portion abut against the swing body and are located on two sides of the arc-shaped groove, respectively.

7. The synchronization mechanism according to claim 5, wherein the rod body comprises a first shaft section and a second shaft section, a diameter of the first shaft section is greater than a diameter of the second shaft section and greater than a width of the slide groove, the stop portion is disposed at an end of the first shaft section facing away from the second shaft section, the second shaft section is slidably disposed in the slide groove, and the first shaft section is in an interference fit with the swing hole or is bonded to the swing hole.

8. The synchronization mechanism according to claim 1, wherein each of the two slide rail arms rotates between an initial position and an end position, and the slide groove is bent downward gradually along a direction facing away from the base.

9. The synchronization mechanism according to claim 1, wherein the synchronization mechanism further comprises a driving shaft, the stop rack comprises a stop body and two hinged protrusions disposed on two sides of the stop body respectively, each of the two second rotation portions comprises a hinged hole passing through a respective one of the two hinged protrusions along the length direction, two hinged blocks opposite to each other are provided on one end of each of the at least two slide rail arms, a hinged groove is formed between the two hinged blocks, each of the two hinged blocks is provided with a rotation hole along the length direction, each of the two hinged protrusions is inserted into the hinged groove, and the driving shaft passes through the hinged hole and the rotation hole.

10. The synchronization mechanism according to claim 9, wherein each of the two hinged protrusions is provided with a first limit protrusion, the first limit protrusion is arc-shaped and disposed around an outer periphery of the hinged hole, each of the two hinged blocks is provided with a second limit protrusion, and the second limit protrusion is arc-shaped and disposed around an outer periphery of the rotation hole; and each of the two slide rail arms rotates between an initial position and an end position with respect to the stop rack, in response to each of the two slide rail arms being at the initial position, one end of the first limit protrusion abuts against one end of the second limit protrusion, and in response to each of the two slide rail arms being at the end position, the other end of the first limit protrusion abuts against the other end of the second limit protrusion.

11. The synchronization mechanism according to claim 9, wherein the driving shaft comprises a shaft body and a shaft limit portion, an outer diameter of the shaft body is less than an outer diameter of the shaft limit portion, the shaft body passes through the two hinged blocks and the rotation hole, the shaft limit portion is located on a side of a respective one of the two slide rail arms facing the spindle seat, and the spindle seat is provided with an avoidance notch for accommodating the shaft limit portion.

12. The synchronization mechanism according to claim 11, further comprising two torsion assemblies, wherein each of the two torsion assemblies comprises two intermediate gears engaging with each other and two main gears disposed on outer sides of the two intermediate gears respectively, the two slide rail arms on the stop rack are connected to the two main gears respectively and rotate around two axes of the two main gears, respectively, the two slide rail arms are relatively secured to the two main gears in circumferential directions of the two main gears respectively, the two intermediate gears are rotatably disposed on the stop rack, the two intermediate gears engage with the two main gears respectively, each of the two main gears is provided with a gear hole, and the driving shaft passes through two gear holes of the two main gears.

13. The synchronization mechanism according to claim 12, wherein each of the two main gears is provided with a limit protruding block located on a circumferential side of the gear hole, each of the two hinged blocks is provided with a limit groove disposed on a circumferential side of the rotation hole, and the limit protruding block is inserted into the limit groove; and wherein the limiting groove of one of the two hinged blocks communicates with the rotation hole, and the limiting groove of the other one of the two hinged blocks is spaced from the rotation hole.

14. A folding hinge, comprising two door plates, two housing connecting rods and a synchronization mechanism, wherein the synchronization mechanism comprises:

a base, wherein the base comprises a spindle seat and a stop rack, wherein two first rotation portions are respectively provided on two sides of the spindle seat along a width direction; the stop rack is detachably connected to the spindle seat, and two second rotation portions are respectively provided on two sides of the stop rack along the width direction, wherein one of the stop rack or the spindle seat is provided with an overlapping groove, the other one of the stop rack or the spindle seat is provided with an inserting protrusion, and the inserting protrusion is inserted into the overlapping groove;

two swing arms, wherein the two swing arms are rotatably disposed on the two first rotation portions respectively;

two slide rail arms, wherein the two slide rail arms are synchronously and rotatably disposed on the two second rotation portions respectively, and each of the two slide rail arms is provided with a slide groove; and two connecting rod shafts, wherein each of the two connecting rod shafts comprises a first end and a second end, the first end of each of the two connecting rod shafts is connected to a respective one of the two swing arms, the second end of each of the two connecting rod shafts is in a sliding fit with the slide groove of a respective one of the two slide rail arms, and the two slide rail arms are configured to rotate to respectively drive the two swing arms; and wherein the two housing connecting rods are located on two sides of the base along the width direction respectively, are in a sliding fit with the two slide rail arms respectively and are hinged with the two swing arms respectively, and the two door plates are located on the two sides of the base along the width direction respectively, are in a rotation fit with the two housing connecting rods respectively and are in a rotation fit with the two connecting rod shafts respectively.

15. The folding hinge according to claim 14, wherein a rotation groove is provided on a side of each of the two housing connecting rods facing a respective one of the two swing arms, one first connecting hole is provided on each of opposite sidewalls of the rotation groove, a rotation protrusion is provided on a side of the respective one of the two swing arms facing a respective one of the two housing connecting rods, a second connecting hole passes through the rotation protrusion along a length direction, the rotation protrusion is inserted into the rotation groove, a connecting shaft passes through the second connecting hole, and two ends of the connecting shaft are located in two first connecting holes respectively.

16. The folding hinge according to claim 15, further comprising a median plate, wherein the spindle seat is provided with an overlapping groove, the stop rack is provided with an inserting protrusion, the inserting protrusion is inserted into the overlapping groove, the overlapping groove passes through the spindle seat along a thickness direction, and the median plate is soldered onto the spindle seat and covers the overlapping groove.

17. The folding hinge according to claim 16, wherein two first limit portions opposite to each other are formed at an opening of a stepped groove; and the inserting protrusion comprises an inserting body extending along a length direction and second limit portions disposed at an end of the inserting body and extending along the width direction, a width of the inserting protrusion at the second limit portions is greater than a width of the overlapping groove at the two first limit portions, and the second limit portions are disposed on one side facing away from the opening of the overlapping groove.

18. The folding hinge according to claim 17, wherein each of the two swing arms comprises a swing body and a connecting portion connected to one end of the swing body, the connecting portion is in a rotation fit with a respective one of the two first rotation portions, the swing body is provided with a swing hole, and each of the two connecting rod shafts passes through and is secured within the swing hole.

19. The synchronization mechanism according to claim 14, wherein each of the two slide rail arms is provided with a slide protrusion, each of the two housing connecting rods is provided with a slide rail groove, the slide protrusion is configured to be in a sliding fit with the slide rail groove of a respective one of the two housing connecting rods, and the slide protrusion is provided with a notch for avoidance of the respective one of the two housing connecting rods.

* * * * *